US009226492B2

(12) United States Patent
Brown

(10) Patent No.: US 9,226,492 B2
(45) Date of Patent: Jan. 5, 2016

(54) METHOD AND SYSTEM FOR DETERRING ANIMALS

(75) Inventor: Crawford Renfrew Brown, Cromwell (NL)

(73) Assignee: INVISI SHIELD LIMITED, Auckland (NZ)

( * ) Notice: Subject to any disclaimer, the term of this patent is extended or adjusted under 35 U.S.C. 154(b) by 356 days.

(21) Appl. No.: 13/810,063

(22) PCT Filed: Jul. 13, 2011

(86) PCT No.: PCT/NZ2011/000130
§ 371 (c)(1),
(2), (4) Date: Mar. 14, 2013

(87) PCT Pub. No.: WO2012/008855
PCT Pub. Date: Jan. 19, 2012

(65) Prior Publication Data
US 2013/0180466 A1    Jul. 18, 2013

(30) Foreign Application Priority Data

Jul. 14, 2010    (NZ) .......................................... 586797

(51) Int. Cl.
*A01M 29/10*    (2011.01)
*A01M 29/00*    (2011.01)
*F21V 9/14*    (2006.01)

(52) U.S. Cl.
CPC ............... *A01M 29/10* (2013.01); *A01M 29/00* (2013.01); *F21V 9/14* (2013.01)

(58) Field of Classification Search
CPC ..... A01M 29/00; A01M 29/06; A01M 29/08; A01M 29/10; F21V 9/14
USPC .......................... 116/22 A; 340/573.2, 573.3
See application file for complete search history.

(56) References Cited

U.S. PATENT DOCUMENTS

| 3,200,698 A | 8/1965 | Bradsell et al. |
| 4,020,336 A | 4/1977 | Linder |
| 6,058,661 A * | 5/2000 | Hand et al. ...................... 52/101 |
| 6,208,463 B1 | 3/2001 | Hansen et al. |
| 6,437,318 B1 | 8/2002 | Egloff et al. |
| 2005/0145162 A1 * | 7/2005 | Marcus ....................... 116/22 A |

FOREIGN PATENT DOCUMENTS

| JP | 2010118294 A * | 5/2010 | ............ A01M 29/00 |
| JP | 2010-220542 | 10/2010 | |

* cited by examiner

*Primary Examiner* — Richard A. Smith
(74) *Attorney, Agent, or Firm* — Jacobson Holman, PLLC

(57) ABSTRACT

An animal deterrence system projects polarized light in order to deter animals. The light may be plane polarized light and the polarization may be varied over time. The system is particularly suited to deterrence of birds, but may also find application in deterrence of other animals sensitive to polarization of light, such as bees and wasps. The system may be used on vineyards or orchards, or around airports, or in any other place where birds are problematic.

24 Claims, 4 Drawing Sheets

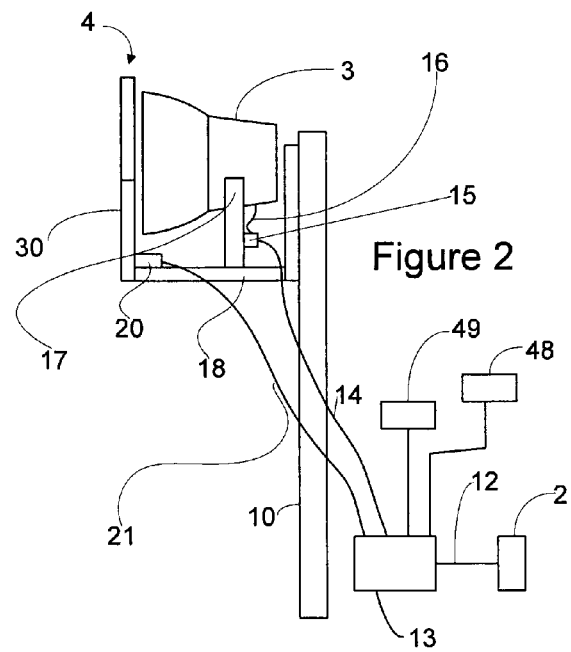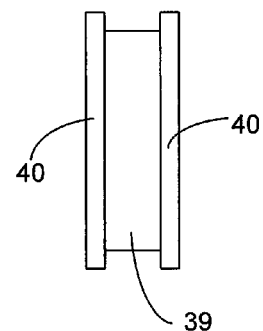
Figure 4
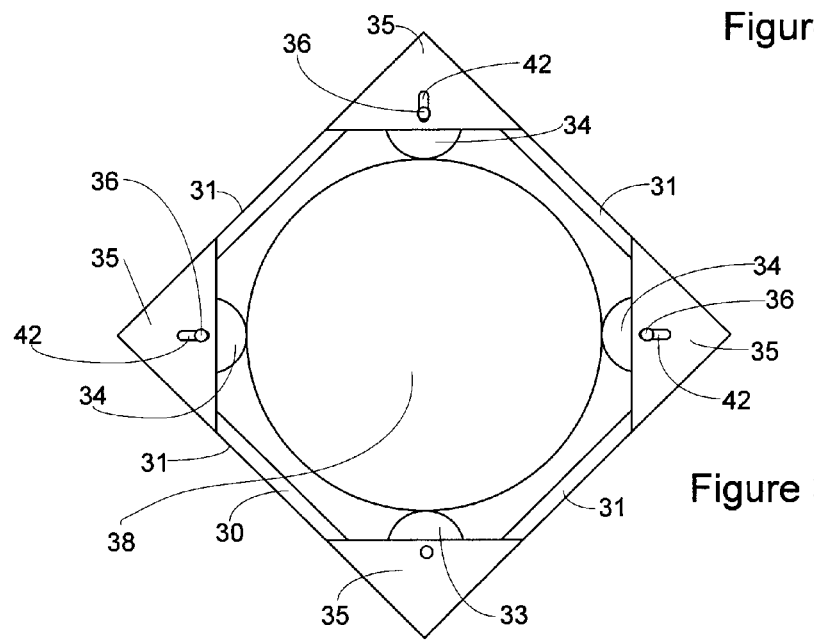
Figure 3

METHOD AND SYSTEM FOR DETERRING ANIMALS

This is a national stage of PCT/NZ11/000130 filed Jul. 13, 2011 and published in English, which has a priority of New Zealand no. 586797 filed Jul. 14, 2010, hereby incorporated by reference.

The invention relates to systems and methods for deterring animals, in particular but not exclusively, to systems and methods for deterring birds.

It is well known that bird damage to horticultural crops and some other agricultural crops has a huge economic effect on world food production, resulting in losses amounting to tens of billions of dollars per year. The bulk of this cost is made up of actual crop loss, but a significant proportion is made up of costs associated with mitigating against such damage. This is particularly true for growers of valuable and usually intensively grown crops such as cherries and wine grapes, for instance. In Central Otago, New Zealand, where both cherries and grapes are grown, growers can spend several thousand dollars per hectare per year on protecting their crop against bird damage.

By far the most effective form of bird control is complete enclosure of the crop within bird netting. This leads to increased costs, both through the cost of the netting and the labour required to install and later to remove the netting. This results in lower profit margins and/or increased costs for the consumer. In other words, a physical barrier works at least to some degree, but at significant cost. In addition, physical barriers such as netting are often unsightly and obtrusive.

Other forms of bird control exist, but none is as effective as complete enclosure by netting. These other forms of control include loud noises such as are produced by "gas guns" or shotguns, recorded bird distress calls played through a network of loudspeakers, scarecrows of varying design, tethered kites, and "tame" falcons. All these have their disadvantages, especially the factor of acclimatisation, as birds quickly become accustomed to noises and scarecrows.

Birds also cause undesirable damage in other environments, such as airports. So-called "bird strike" causes significant damage to planes, especially during takeoff and landing. The physical damage caused to aircraft is costly to repair and can keep the plane out of the air for significant periods.

Birds are also attracted to cruise ships when they are lit up at night. This can be unpleasant for passengers and creates the need for an extensive cleaning operation every morning.

In cities, birds (especially pigeons) can be undesirable, contaminating public spaces and harassing people enjoying those spaces.

In many environments (including airports and cities) total enclosure with physical barriers such as nets is clearly impossible. In others, physical barriers may be used but are expensive and can be unsightly.

Insects, particularly bees and wasps, also cause significant damage in vineyards and orchards. Insects such as bees and wasps are of course completely unaffected by many physical barriers such as bird netting.

It is an object of the invention to provide an improved system and method for deterring animals, or at least to provide the public with a useful choice.

SUMMARY OF THE INVENTION

In a first aspect the invention provides an animal deterrence apparatus including a light source providing light in a wavelength range detectable by a target animal and a polariser, the system configured to project polarised light over an area in which animals are to be deterred.

Preferably the polariser is a variable element configured to vary the polarisation of the projected light over time.

Preferably the variable element is a rotating polarising filter.

Preferably the filter is a plane polarising filter.

Preferably the filter rotates at a rate in the range 1 to 500 cycles per minute. Preferably the filter rotates at a rate in the range 1 to 75 cycles per minute.

Preferably the rate of rotation of the filter varies with time. Preferably the rate of rotation varies in a random manner.

Preferably the target animal is a bird.

This first aspect also encompasses an animal deterrence system including two or more such apparatuses.

In a second aspect the invention provides a method for deterring animals, including: projecting polarised light in a wavelength range detectable by a target animal.

Preferably the polarisation of the projected light is varied over time.

Preferably the polarisation is varied using a rotating polarising filter.

Preferably the filter is a plane polarising filter.

Preferably the filter is rotated at a rate in the range 1 to 500 cycles per minute. Preferably the filter is rotated at a rate in the range 1 to 75 cycles per minute.

Preferably the method includes varying the rate of rotation of the filter with time. Preferably the rate of rotation is varied in a random manner.

Preferably the target animal is a bird.

BRIEF DESCRIPTION OF THE DRAWINGS

The invention will now be described by way of example only, with reference to the accompanying drawings, in which:

FIG. 2 shows a system according to a further embodiment;

FIG. 3 shows a variable polariser arrangement from the system of FIG. 2;

FIG. 4 shows a roller from the arrangement of FIG. 3;

DETAILED DESCRIPTION

It is known that many species of bird can detect various optical properties of light. It is believed that birds use this ability in navigation.

It is also known that some sugars can have an effect on the polarisation of light. For example, it is known that different sugars are dextrorotary (e.g. glucose, sucrose, fructose, maltose) and others are levorotary (e.g. lactose). These sugars rotate light to the right (for dextrorotary sugars) or the left (for levorotary sugars).

Without being bound by theory, the Applicant believes that birds may be attracted to ripe fruit by the effect that sugars within the fruit have on the polarisation of light. It is possible, for example, that birds may see a halo, spike or other visual effect around a ripe berry. This theory is consistent with birds' ability to detect and consume a ripe grape, for example, while leaving untouched adjacent grapes which are not yet fully ripe. Similarly, bees and wasps also cause significant damage in vineyards and orchards, also seeking out sugar in ripe fruit. Again without being bound by theory, the Applicant believes that bees and wasps are also attracted to the ripe fruit by the polarising effects of the sugars in the fruit.

The Applicant has invented a method and system for deterring birds and/or other animals based on their sensitivity to polarised light.

The Applicant's invention relies on projecting polarise light over an area in which animals are to be deterred, in order to confuse the birds and/or other animals, disturb them, make them uncomfortable or otherwise deter them. In a preferred embodiment the invention also involves varying the polarisation of light in order to confuse the birds and/or other animals, disturb them, make them uncomfortable or otherwise deter them.

Figure 1:
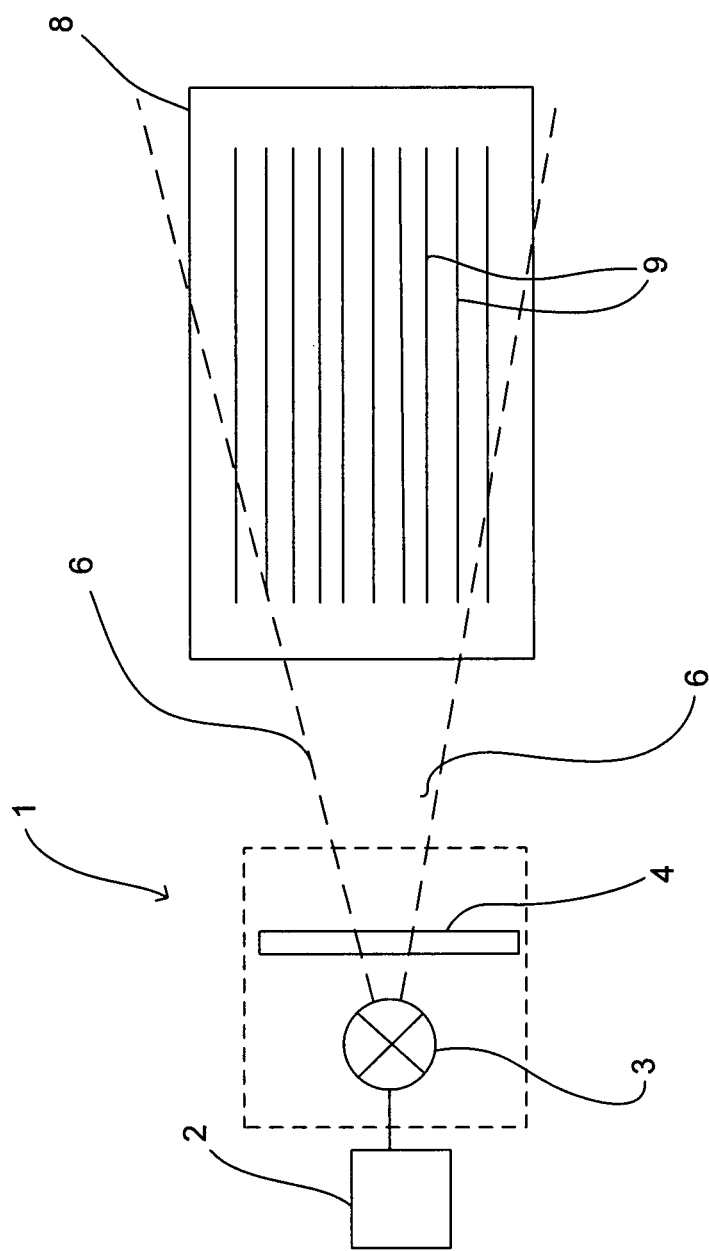
FIG. 1 is a schematic view of an animal deterring system according to one embodiment.

FIG. 1 illustrates a deterrent system according to one embodiment. The system 1 includes a power source 2 which powers a light source 3. The power source 2 may be any suitable source, include a mains power connection, battery, photovoltaic system etc. A light sensor switch may be incorporated to turn the system "off" during hours of darkness. The light source 3 may also be any suitable conventional source, including a floodlight, for example. In addition, when the weather is suitable it may be possible to use sunlight with a reflector.

The light source should be such that the wavelength of light can be detected by the animal to be deterred. A broad wavelength range may be used. In general the Applicant believes that birds are sensitive to what humans call the visible spectrum. The Applicant understands that there are differences in sensitivity, particularly at the infrared and ultraviolet ends of the spectrum. However, a source providing a broad wavelength range in the visible spectral region will generally be suitable.

The system 1 also includes a variable optical element 4, which in one embodiment is a plane polarising filter arranged to rotate. In use, the light source produces a beam of light indicated by the dashed lines 6. This beam of light passes through the rotating plane polariser 4 and is projected over an area in which birds are to be deterred. In FIG. 1 the beam is projected over a vineyard 8 including rows of grapes 9. The beam of light projected over the vineyard therefore is plane polarised, with a rotating plane of polarisation.

The rotating filter may rotate at a rate in the range 1 to 500 cycles per minute, preferably 1 to 75 cycles per minute. Suitable rates may be different for different target animals. In addition, in order to reduce the risk of animals becoming accustomed to the varying polarisation, the rate of rotation may be varied, possibly in a random manner.

The rotating filter may be driven by means of a belt drive, or similar, connected to a variable speed motor. Alternatively a motorised drive with a variable gearing could be used. A brushless DC 12V or 24V motor may be suitable in some applications. The filter may be mounted in a frame with four rollers, one of which is driven by a friction drive roller of suitable diameter. Alternatively the rotating filter may be rotatably mounted on an axle. In some applications one or more vanes may be provided on the rotating filter such that rotation is driven by the wind.

FIGS. 2 to 4 show a further embodiment. The apparatus may include a support 10 suitable for the desired application. For example, the support 10 may be a permanently fixed post or a metal tubular post fixed at its lower end to a movable base (not shown). Alternatively, the apparatus may be fixed to the side of a building or other structure.

A power source 2, which may any of the sources discussed above, supplies power over connection 12 to a power and control unit 13. The supplied power is preferably mains power (230V AC at 50 Hz in New Zealand, but other voltages and frequencies in other countries).

The power and control unit 13 supplies power over connection 14, preferably at the mains voltage, to a ballast 15. The ballast 15 is connected to a light source 3 over connection 16. The light source 3 may be supported on a light source support 17 mounted to a platform 18 on the support 10. Any suitable arrangement for supporting the light source 3 on the support 10 may be used. In the embodiment shown a ballast 14 is supported on the light source support 15, but again any suitable support arrangement may be used where a ballast is required. The light source 3 may be a compact fluorescent bulb of a suitable power rating, e.g. 120 Watts, emitting generally white light. The Applicant believes such a light source to be effective over a range of more than 100 meters. Other power ratings may be suited to other applications. For example, small domestic units could be made incorporating a low power light source (such as an LED source) with a small rotating polariser. Such a small scale device could be used to protect a small strawberry patch or fruit tree or the like.

The light source may be mounted in a floodlight housing or similar to project light forwards.

The power and control unit may also provide power to a drive arrangement 20 over connection 21. The power is supplied at a suitable voltage for the drive motor. In the embodiment shown the drive arrangement preferably includes a 24 DC motor, with the power and control unit including suitable circuitry to convert mains power to 24 V DC. Such circuitry is well understood by the skilled reader and need not be discussed further.

In front of the light source there is positioned a variable polarising element 4 driven by the drive arrangement 20. The variable polarising element 4 is shown in more detail in the front view of FIG. 3. A framework 30 may be mounted to the platform 18 and may include four side members 31 arranged to form a square or diamond.

At each corner of the framework 30 a roller 33, 34 is mounted using front and back corner plates 35, of which only the front corner plates can be seen in FIG. 3. Each roller 33, 34 is mounted on a bolt 36 or other component providing an axle. These rollers 33, 34 support a polarising filter 38 which is generally formed as a disc. As shown in FIG. 4 the rollers may be formed in three sections to provide a recessed central region 39 between two larger diameter outer regions 40. The edge of the polarising filter 38 will ride securely in these central recesses, keeping the filter 38 properly aligned within the framework 30.

Three of the corners have corner plates 35 formed with slots 42, which allow the position of the bolts 36 to be adjusted for insertion, removal or adjustment of the polarising filter 38.

One or more of the rollers may be driven for rotation of the polarising filter 38. In the embodiment shown roller 33 is driven. This roller is mounted to a shaft of the motor 20. Driven rotation of this roller causes rotation of the polarising filter 38, which rides freely over the other rollers 34.

The rollers 33, 34 may be mounted in any suitable manner using bearings, spacers etc to mount the rollers and to reduce friction. The rollers may be made from any suitable material, including plastics materials. Nylon may be suitable for some applications.

The control and power unit 13 may control the supply of power to the system and the rotation of the polarising filter 38 in any desired manner for the particular application. The rotation of the polarising filter 38 may simply be driven at constant speed, or in an irregular or random manner. The control and power unit may receive input from users and from sensors. Thus users may interact with user input devices 48 to turn the system on and off, or to provide a schedule for operation of the system. Sensors 49 may include light sensors, for turning the unit off after dark and on at dawn. Sensors 49 may also include, for example, temperature sensors such that the system can be shut down in freezing conditions to prevent damage to the moving parts. In general any sensors suitable for the application may be used.

The control function may be separated from the power supply to create a separate control unit.

Figure 5:
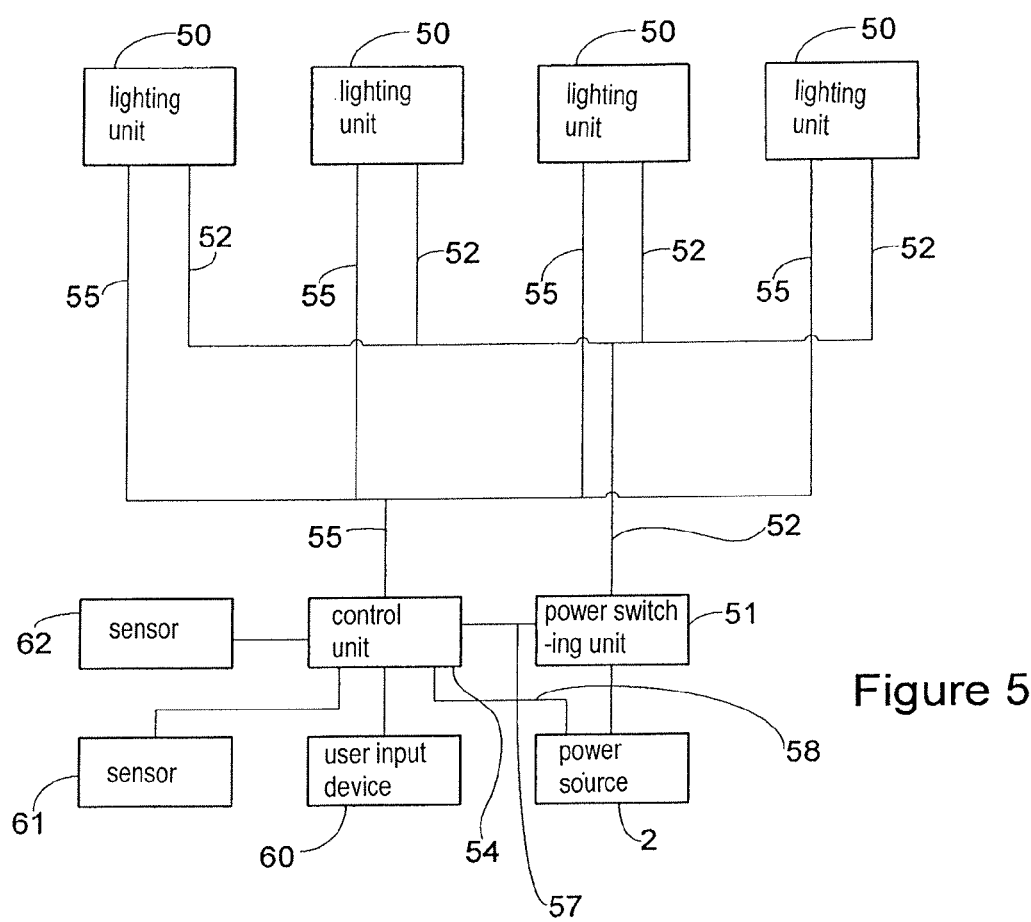
FIG. 5 shows a system according to a further embodiment.

FIG. 5 shows a wider area embodiment in which a number of lighting units 50 are powered and controlled. Such a system may be employed in a large scale vineyard or orchard, or at an airport, for example.

Each lighting unit includes a light source and variable polarising element, and these may be arranged substantially as described above with reference to FIGS. 2 to 4.

A power switching unit 51 receives power from power source 2 (preferably a mains source) and distributes power to the lighting units 50 over a network of power lines 52.

A control unit 54 is connected to each light source via control lines 55. Any suitable network of control lines may be used. The control unit controls parameters of the polarisation variation, such as rate of variation (e.g. rate of rotation). In addition the control unit may be connected to the power switching unit 51 by control line 57. The control unit controls the switching unit to turn the power supply to the system on or off. Preferably the control unit has its own connection 58 to power supply 2, independent of the switching unit 51.

The control unit may receive input from a number of sources. A user may input control parameters at user input device 60. The control unit may receive sensor data from sensors 61, 62.

Although the embodiment shown has a single switching unit to switch power to the whole system on or off, in some embodiments a more complex system could be employed that is capable of switching each lighting unit on or off, or possibly switching small groups of lighting units on off.

Figure 6:
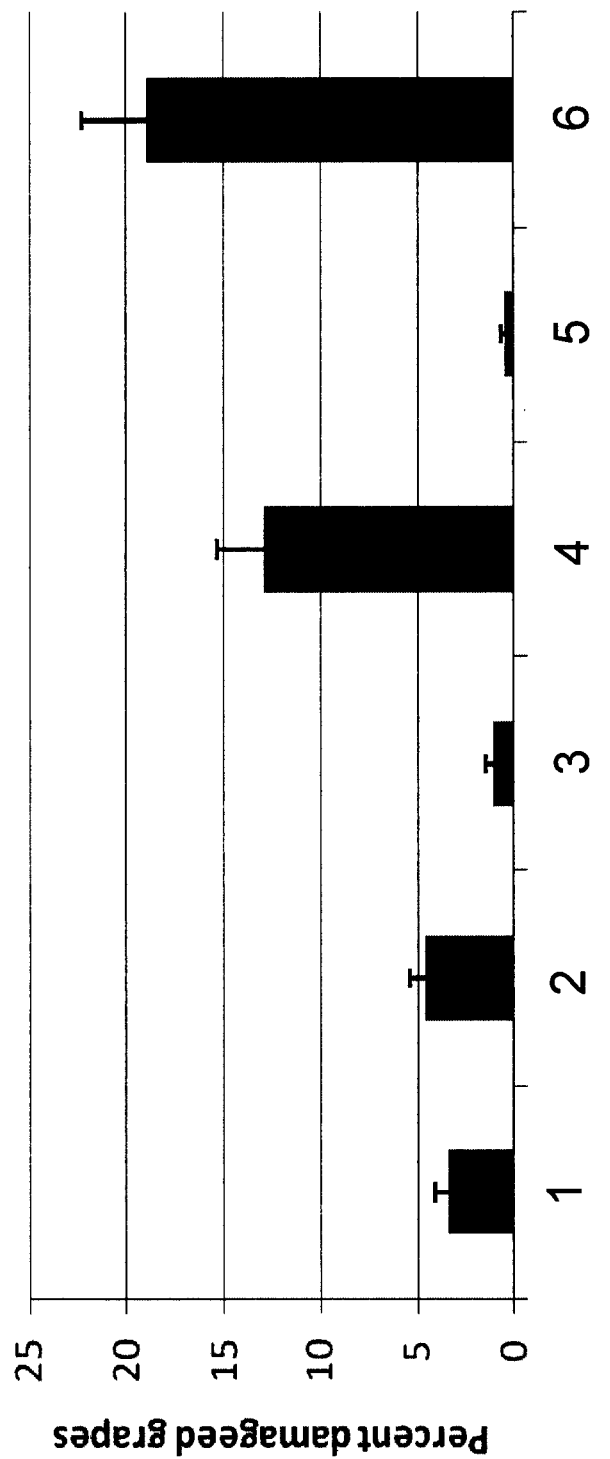
FIG. 6 is a graph of testing results of the Applicant's system.

FIG. 6 is a graph showing results of testing on vineyards in the Central Otago region of New Zealand. The vertical axis shows a percentage value for the number of grapes damaged in samples taken from each vineyard. Tests were made in six areas (Areas 1, 2, 3, 4, 5 and 6) as set out in the following table:

| Area | Applicant's system employed? | Other bird-deterrent measures employed |
|---|---|---|
| 1 | Yes | None |
| 2 | No | Nets, recorded bird distress calls (110 dB), shotgun patrols, hawk kites. |
| 3 | Yes | Nets |
| 4 | No | Nets |
| 5 | Yes | Nets |
| 6 | No | Nets |

Areas 1 and 2 neighbour each other, as do areas 3 and 4, and areas 5 and 6. Lights were arranged in each area with around 1 light per hectare. The density of lights used will in general depend on the power of the lights, the width of their beams and factors specific to the application such as obstructions, geography etc.

The results show a strong reduction in damage at both Areas 3 (compared to 4) and 5 (compared to 6) from the use of the Applicant's system.

At Area 1 the reduction is still present compared to Area 2, but less pronounced. It is believed this is due to the range of other deterrent measure employed at Area 2 together with the discovery that a section of Area 1 was in fact obscured from the lights used.

The Applicant's testing indicates that marked reductions in bird damage or marked reductions in the costs of bird deterrence measures is possible.

Although the embodiments discussed above use rotating filters, other suitable methods of varying the polarisation may be used. For example, a number of light sources may be used, with each light source having a filter in a different polarisation. The light sources can then be switched on and off in sequence to project light of varying polarisation.

Similarly although preferred embodiments require the variation of the polarisation, e.g. rotation of the plane of polarisation, in some applications projection of unvarying polarised light may be used or unvarying polarised light may be switched on and off, possibly in an irregular manner. However, the variation of the optical property is preferred as it is less likely that animals will acclimatise, thereby reducing the effectiveness of the deterrence system.

The Applicant's invention may be useful in deterring birds in order to prevent bird damage. The invention may be used to protect vineyards, orchards etc, at airports, cities, on ships or in any other environment where birds cause damage or are otherwise undesirable. The Applicant's invention may also find application in deterring other animals which are sensitive to the polarisation of light, particularly damage causing insects such as bees and wasps. An account of animal sensitivity to polarised light can be found in "*Polarized Light in Animal Vision*" by Horvath and Varju, Springer-Verlag 2003, ISBN: 3540404570, the contents of which are incorporated by reference herein.

The Applicant's invention will provide a significant cost advantage over previous methods, particularly because the large labour costs of installing and removing physical barriers such as nets will be avoided. In addition the Applicant's invention has minimal environmental impact and is unobtrusive, in contrast to previous systems, many of which have required sudden explosive reports or ugly physical barriers.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departure from the spirit or scope of the Applicant's general inventive concept.

The invention claimed is:

1. An animal deterrence apparatus including a light source providing light in a wavelength range detectable by a target animal and a polariser, the apparatus configured to project polarised light over an area in which animals are to be deterred.

2. The apparatus as claimed in claim 1 wherein the target animal is a bird.

3. The apparatus as claimed in claim 2 wherein the polariser is a variable polarising element configured to vary the polarisation of the projected light over time.

4. The apparatus as claimed in claim 3 wherein a rate of variation of the polarisation of the projected light over time also varies with respect to time.

5. The apparatus as claimed in claim 4 wherein the variable polarising element is a rotating polarising filter.

6. The apparatus as claimed in claim 3 wherein the variable polarising element is a rotating polarising filter.

7. The apparatus as claimed in claim 6 wherein the filter is a plane polarising filter.

8. The apparatus as claimed in claim 7 wherein the filter rotates at a rate in the range 1 to 500 cycles per minute.

9. The apparatus as claimed in claim 6 wherein the filter rotates at a rate in the range 1 to 500 cycles per minute.

10. The apparatus as claimed in claim 9 wherein the filter rotates at a rate in the range 1 to 75 cycles per minute.

11. The apparatus as claimed in claim 6 wherein the rate of rotation of the filter varies with time.

12. The apparatus as claimed in claim 6 wherein the rate of rotation varies in a random manner.

13. An animal deterrence system including two or more apparatuses according to claim 1.

14. A method for deterring animals, including: projecting polarised light in a wavelength range detectable by a target animal over an area in which animals are to be deterred.

15. The method as claimed in claim 14 wherein the target animal is a bird.

16. The method as claimed in claim 15 including varying the polarisation of the projected light over time.

17. The method as claimed in claim 16 including varying a rate of variation of the polarisation of the projected light over time.

18. The method as claimed in claim 17 including varying the polarisation using a rotating polarising filter.

19. The method as claimed in claim 16 including varying the polarisation using a rotating polarising filter.

20. The method as claimed in claim 19 wherein the filter is a plane polarising filter.

21. The method as claimed in claim 19 including rotating the filter at a rate in the range 1 to 500 cycles per minute.

22. The method as claimed in claim 21 including rotating the filter at a rate in the range 1 to 75 cycles per minute.

23. The method as claimed in claim 19 including varying the rate of rotation of the filter with time.

24. The method as claimed in claim 23 including varying the rate of rotation in a random manner.

* * * * *